United States Patent [19]
Bostel

[11] Patent Number: 4,991,292
[45] Date of Patent: Feb. 12, 1991

[54] METHOD OF PRODUCING ELASTOMERIC STATORS FOR ECCENTRIC HELICAL PUMPS

[75] Inventor: Karl-Heinz Bostel, Laatzen, Fed. Rep. of Germany

[73] Assignee: Gummi-Jäger KG GmbH & Cie, Hanover, Fed. Rep. of Germany

[21] Appl. No.: 387,293

[22] Filed: Jul. 28, 1989

[30] Foreign Application Priority Data

Jul. 30, 1988 [DE] Fed. Rep. of Germany ....... 3826033

[51] Int. Cl.$^5$ .......................... B23P 15/00; F01C 1/10
[52] U.S. Cl. ............................ 29/888.023; 29/888.02; 29/888.021
[58] Field of Search ............... 29/156.4 R, 149.5 NM, 29/402.19, DIG. 11, DIG. 29, 888, 888.02, 888.021, 888.023; 264/221, 225, 226, 227, 320; 72/283; 418/48, 153

[56] References Cited

U.S. PATENT DOCUMENTS

| | | | |
|---|---|---|---|
| 3,857,654 | 12/1974 | Streicher | 418/48 |
| 4,232,541 | 11/1980 | Stump | 72/283 |
| 4,338,068 | 7/1982 | Suh et al. | 425/144 |

Primary Examiner—Joseph M. Gorski
Assistant Examiner—S. Thomas Hughes
Attorney, Agent, or Firm—Robert W. Becker & Associates

[57] ABSTRACT

A method of producing elastomeric stators for eccentric helical pumps, with the elastomer shrinking after the stator has been produced. To increase the precision of the pump cavity, this cavity is first made larger than desired. The closed metallic annular casing that surrounds the stator on the outside is then reduced in diameter, for example via a die. In so doing, the elastomer is radially compressed to thereby bring the pump cavity to a precise inner dimension that is a function of the reduction of the casing diameter and is hence independent of the shrinkage.

5 Claims, 1 Drawing Sheet ethod of producing elastomeric stators for eccentric helical pumps

BACKGROUND OF THE INVENTION

1. Field of the Invention

The invention relates to a method of producing an elastomeric stator for an eccentric helical pump, with a core being used to mold a stator cavity that serves for accommodating a pump rotor. The present invention furthermore proceeds further from such stators that on the outside are provided with a metallic casing that is generally made of steel or a similarly strong material. In addition, the phrase elastomeric stators refers to stators in which that portion that delimits the cavity is made of rubber or a rubber-like synthetic material.

During molding of the stator, the elastomer is introduced, for example, by injection. After the molding process, the material is cured or vulcanized. The material is then generally cooled off, whereby a shrinkage occurs that is a function of several factors, including the nature of the material itself.

2. Description of the Prior Art

For these reasons, the production of precisely dimensioned stators of the aforementioned general type causes great difficulty. It has been practically impossible to economically realize stators having close tolerances when the elastomer is altered. i.e. the material is changed.

It is therefore an object of the present invention to propose a method of producing elastomeric stators for eccentric helical pumps where, under the aforementioned conditions, it is possible to produce stators having close tolerances.

BRIEF DESCRIPTION OF THE DRAWING

This object, and other objects and advantages of the present invention, will appear more clearly from the following specification in conjunction with the accompanying schematic drawing, which are used to show various method steps and in which.

SUMMARY OF THE INVENTION

Figure 1:
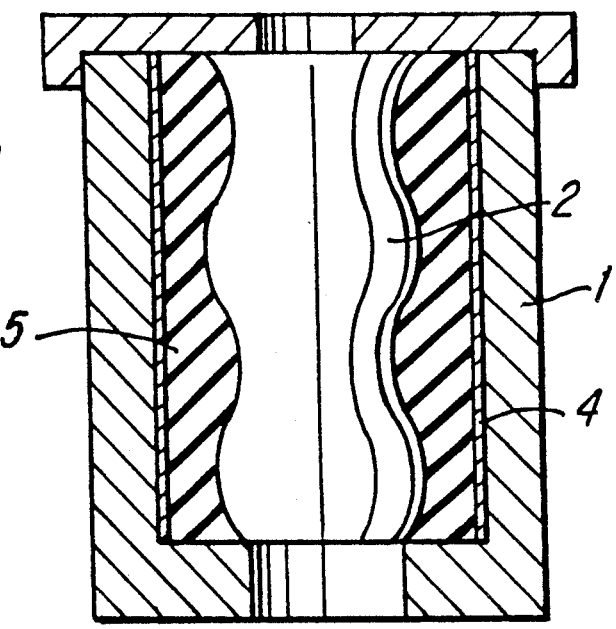
FIG. 1 is a vertical cross-sectional view through an injection mold for molding stators.
Figure 2:
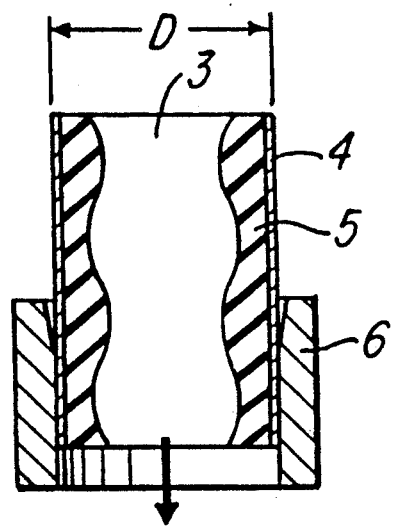
FIG. 2 is a vertical cross-sectional view through a drawing die and a stator that has already partially been handled thereby.
Figure 3:
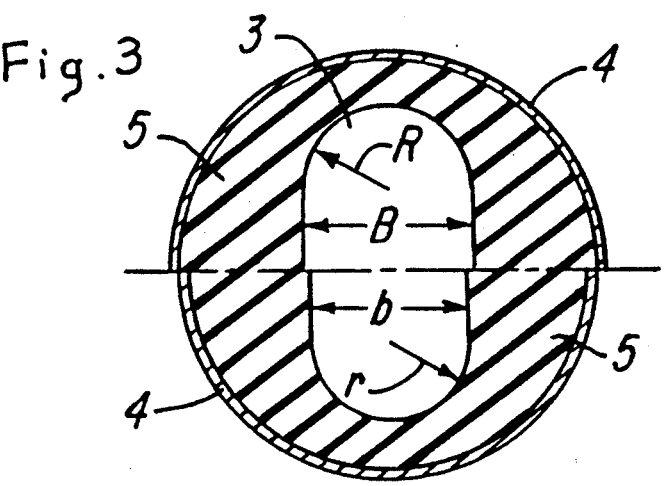
FIG. 3 is a cross-sectional view through a stator, with the upper half showing the cooled and shrunk state, and the lower half showing the finished state.

The method of the present invention is characterized primarily by molding an oversized stator cavity, i.e. one that is larger than finally desired, and then reducing the size of the stator cavity to a desired dimension by reducing the diameter of a closed, hollow-cylindrical casing, accompanied by permanent deformation of the casing.

To produce an appropriately large stator cavity, i.e. one that is too large, a core that is too thick is therefore intentionally used for molding the stator. When the stator body has cooled off, and shrinkage thereof has been completed, a permanent deformation of the metallic stator casing is undertaken by reducing the diameter thereof to the desired extent. This can be accomplished by continuous drawing, for example using a stationary drawing die. As a result of the thereby occurring deformation of the casing, there is effected a corresponding compression of the elastomer that is surrounded by the casing, accompanied by a reduction of the cavity. By using suitable tooling, and possibly repeating the aforementioned steps one or more times, the desired dimensions for the cavity within the stator are then obtained. Furthermore, the inventive method could also be used to recondition stators that have become unusable due to wear. A precondition for this is that a closed stator casing always be used, because only such a casing can exert and maintain the forces necessary for reducing the size of the cavity.

It is known to compensate for wear by using clamping sleeves. However, such a processing requires the use of split or slotted stator casings. In contrast, the present invention utilizes the potential of reducing the diameter of closed, cylindrical metal casings and the processing thereof by continuous drawing, whereby the tooling can be moved relative to the stator, or the stator could even be moved relative to the tooling.

Further specific features of the present invention will be described in detail subsequently.

DESCRIPTION OF PREFERRED EMBODIMENTS

Referring now to the drawing in detail, the hollow cylindrical mold 1 has a centrally disposed core 2, the outer contour of which corresponds to the desired hollow space or cavity 3 of the stator, although with the restriction that it mold a cavity 3 that is approximately 0.2–3% wider or larger than the finished stator cavity is to be.

In a known manner disposed on the outer surface of the mold cavity is the cylindrical, one-piece, unsplit steel sleeve or casing 4. When the stator is finished, the rubber disposed between the casing 4 and the core 2 forms the actual stator body. After injection, the rubber is vulcanized and can then cool off, whereby it experiences a certain amount of shrinkage or contraction, which is a function of the material.

The final or finished size of the stator is then determined by the matrix or die 6, which is to be precisely designed and through which the stator, which is moved in the axial direction, is forced. In so doing, the outer diameter D is reduced in conformity with the size of the die 6. Also resulting in the stator body 5 during this process are certain compressive and radial forces that permit the width B to become the smaller width "b", and the greater radii R to become the smaller radii "r". The reduction in diameter can be approximately 0.1–1.5% of the original diameter D. This reduction in diameter does not reverse itself because a permanent deformation of the casing 4 has taken place.

The permanent deformation that is to be used, and the reduction in diameter that depends thereupon, must be determined as a function of the material. The important thing is that the precision of the diameter D is not particularly crucial, because the chucks that are used to accommodate the stators can be adapted to. Thus, if it becomes necessary to have varying outer diameters in order to achieve precise inner dimensions for different materials, this does not result in a drawback.

It should be noted that during the production of the stators of FIG. 1, the stator body 5 is fixedly connected to the inner surface of the casing 4. Due to the geometry of an eccentric helical pump, the pump cavity (cavity 3) also has a shape that, when viewed in cross-section, is defined by two semicircles and a rectangle (dimensions R or "r" and B or "b", with the width always being equal to twice the radius).

The present invention is, of course, in no way restricted to the specific disclosure of the specification and drawing, but also encompasses any modifications within the scope of the appended claims.

What is claimed is:

1. In a method of producing an elastomeric stator for an eccentric helical pump, including using a core to mold an elastomer to accurately form the stator having a cavity with a final cavity dimension deliberately prior to as well as independently of installation of the elastomeric stator in the eccentric helical pump and that subsequently serves for accommodating a pump rotor in said stator cavity, and shrinking the elastomer after the molding, the improvement in combination therewith comprising the steps of:

providing a unitary closed, hollow-cylindrical casing about said elastomer, said casing having a diameter;

molding said elastomer, thereby intentionally forming a stator with an oversized stator cavity having an initial cavity dimension larger than said final cavity dimension; and reducing the initial cavity dimension to said final cavity dimension by reducing the diameter of said unitary closed, hollow-cylindrical casing, thereby permanently and uniformly deforming said casing and holding said elastomer uniformly therein accurately at the final dimension of said stator cavity for subsequent installing of the elastomeric stator with the pump rotor.

2. The method according to claim 1, in which the step of reducing the diameter of said casing comprises drawing said casing.

3. The method according to claim 2, which includes subjecting said casing several times to said drawing process.

4. The method according to claim 1, in which the step of reducing the diameter of said casing comprises reducing said diameter by approximately 0.1 to 1.5%.

5. The method according to claim 1, in which the step of reducing the diameter of said casing comprises reducing said casing to such an extent that the initial cavity dimension prior to reduction thereof is approximately 0.2–3% greater than after said reduction.

* * * * *